(12) United States Patent
Konduru et al.

(10) Patent No.: US 11,354,269 B2
(45) Date of Patent: Jun. 7, 2022

(54) SNAPSHOT LOAD FRAMEWORK

(71) Applicant: Bank of America Corporation, Charlotte, NC (US)

(72) Inventors: Sudheer Konduru, Dallas, TX (US); Nadeem Panjwani, Dallas, TX (US); Vinod Patil, Dallas, TX (US); Sravan Mateti, Dallas, TX (US); Paul Eric Hazboun, Flower Mound, TX (US); Douglas J. Goddard, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 103 days.

(21) Appl. No.: 16/773,165

(22) Filed: Jan. 27, 2020

(65) Prior Publication Data
US 2021/0232538 A1    Jul. 29, 2021

(51) Int. Cl.
*G06F 16/11*    (2019.01)
*G06F 16/22*    (2019.01)

(52) U.S. Cl.
CPC ........ *G06F 16/128* (2019.01); *G06F 16/2282* (2019.01)

(58) Field of Classification Search
CPC .......................... G06F 16/128; G06F 16/2282
USPC ....................................................... 707/639
See application file for complete search history.

(56) References Cited

U.S. PATENT DOCUMENTS

| | | |
|---|---|---|
| 5,233,513 A | 8/1993 | Doyle |
| 11,165,754 B2 | 11/2021 | Pattanaik et al. |
| 2005/0094640 A1 | 5/2005 | Howe |
| 2007/0169103 A1* | 7/2007 | Bhatkhande ............. G06F 8/71 717/170 |
| 2010/0232322 A1 | 9/2010 | Umayabashi et al. |
| 2011/0282914 A1 | 11/2011 | Block et al. |
| 2013/0245810 A1 | 9/2013 | Sullivan et al. |
| 2016/0021224 A1 | 1/2016 | Howe |
| 2019/0243836 A1* | 8/2019 | Nanda ................. G06F 16/258 |
| 2020/0394110 A1* | 12/2020 | Ramohalli Gopala Rao ............... H04L 67/1097 |
| 2021/0057614 A1 | 2/2021 | Liu et al. |
| 2021/0232538 A1 | 7/2021 | Konduru et al. |

(Continued)

OTHER PUBLICATIONS

"Data Lake," https://en.wikipedia.org/wiki/Data_lake, Wikimedia Foundation, Inc., Jan. 2, 2020.

(Continued)

*Primary Examiner* — Hung T Vy
(74) *Attorney, Agent, or Firm* — Weiss & Arons LLP

(57) ABSTRACT

In entity transition from legacy systems to a big data distributed data platform, numerous system-based architectural gaps have surfaced. There exists a need for a bridge component for each of the architectural gaps in order to support the entity transition to the big data distributed data platform. These bridge components include a variety of frameworks that are configured to automate certain processes that are needed for the transition. These processes have only become necessary as a result of the Hadoop platform. The automated processes include a snapshot load platform. The snapshot load platform enables the addition of a new view to the historical tables. The platform includes replacing the entire table in a truncated scenario. The platform includes replacing cases in a refresh or update scenario.

12 Claims, 10 Drawing Sheets

(56) References Cited

U.S. PATENT DOCUMENTS

2021/0232549 A1 7/2021 Mateti et al.
2021/0232560 A1 7/2021 Mateti et al.

OTHER PUBLICATIONS

"Data Lake vs. Data Warehouse," https://www.talend.com/resources/data-lake-vs-data-warehouse/, Talend, Retrieved on Jan. 15, 2020.

Margaret Rouse, "Data Lake," TechTarget, Mar. 13, 2019.

Amber Lee Dennis, "Data Lakes 101: An Overview," https://www.dataversity.net/data-lakes-101-overview/, Aug. 25, 2016.

"How to Flatten Data Using Google BigQuery's Legacy vs Standard SQL," https://chartio.com/resources/tutorials/how-to-flatten-data-using-google-bigquerys-legacy-vs-standard-sql/, Chartio, Retrieved on Jan. 16, 2021.

Hakon Hapnes Strand, "What is 'Flatten Data' in a Database?" https://www.quora.com/What-is-flatten-data-in-a-database. Quora, Inc., Jul. 20, 2018.

"Hadoop: Big Data Analysis Framework," www.tutorialspoint.com, Retrieved on Nov. 13, 2019.

"Hibernate (framework)," https://en.wikipedia.org/wiki/Hibernate_(framework), Wikimedia Foundation, Inc., Jan. 13, 2020.

"Hibernate Query Language (HQL)," https://www.javatpoint.com/hql, Retrieved on Jan. 13, 2021.

Bernard Marr, "What Is A Data Lake? A Super-Simple Explanation for Anyone," https://www.forbes.com/sites/bernardmarr/2018/08/27/what-is-a-data-lake-a-super-simple-explanation-for-anyone/, Aug. 27, 2018.

"What is a Data Lake?" https://aws.amazon.com/big-data/datalakes-and-analytics/what-is-a-data-lake/, Amazon Web Services, Inc., Retrieved on Jan. 15, 2020.

"Connect: Direct," https://en.wikipedia.org/wiki/Connect:Direct, Wikimedia Foundation, Inc., Sep. 28, 2019.

"Create or Replace View in Hive Fails When There Is Are Incompatible Column Type Changes in an Already Existing View," MapR Technologies, Inc., 2018.

"Hive-Insert Overwrite vs. Drop Table + Create Table + Insert Into," https://stackoverflow.com/questions/39618624/hive-insert-overwrite-vs-drop-table-create-table-insert-into, Stack Overflow, 2016.

Jeff Barr, "Hue—A Web User Interface for Analyzing Data With Elastic MapReduce," https://aws.amazon.com/blogs/aws/hue-web-ui-for-emr/, Amazon Web Services, Inc., Nov. 7, 2014.

Carter Shanklin, "Update Hive Tables the Easy Way," https://blog.cloudera.com/update-hive-tables-easy-way-2/, Cloudera, Inc., Aug. 15, 2017.

* cited by examiner

Query tool used to query tables

SNAPSHOT LOAD FRAMEWORK

CROSS-REFERENCE TO RELATED APPLICATIONS

Co-pending U.S. patent application Ser. No. 16/773,034, entitled "VIEW TABLES FRAMEWORK," filed on a date even herewith is hereby incorporated by reference herein in its entirety. Co-pending U.S. patent application Ser. No. 16/773,138, entitled "CONDENSER FRAMEWORK," filed on a date even herewith is hereby incorporated by reference herein in its entirety.

FIELD OF TECHNOLOGY

This application describes apparatus and methods for big data processing in a data lake storing information in native format.

BACKGROUND

In the digital world, organizations utilize data to perform fundamental daily functions. Examples of organizations include grocery stores, universities and financial institutions. Each organization may utilize and store different categories of data. For example, grocery stores may utilize and store point-of-sale ("POS") data, customer data, available food stock data and employee data. Universities may utilize and store student data, book data, class schedule data and employee schedule data. Financial Institutions may utilize and store customer data, bank account data, credit bureau data, card data, mortgage data, vehicle loan data and employee data.

Many times, because there may be different types of data stored within one organization, an organization's data may be stored in multiple source systems, also known as systems of record. Each source system may operate as a mini entity. Each source system may include its own dedicated database and computing system. In an example, an organization may include multiple departments; each department within the multi-department organization may maintain its own database.

However, there may be disadvantages associated with hosting multiple mini entities within an organization. One disadvantage may be data duplicity. Because each mini entity includes its own database and computing system, there may be many records, such as customer records, that are included in more than one mini entity. There may be numerous problems associated with duplicate records. Firstly, duplicate records may waste resources. Secondly, duplicate records may increase the risk of data discrepancies. An example of a data discrepancy may be that a first department may include a middle initial of a person's name and a second department may not include the middle initial of the person's name.

Therefore, it may be desirable to combine the data from all of the source systems to an amalgamated data lake. An amalgamated data lake may be a system or repository of data. The data stored in a data lake may be stored in a natural or raw format, such as blobs or files.

A data lake may be a single storage location for all enterprise data. The enterprise data may include raw copies of source system data. The enterprise data may also include transformed data used for reporting, visualization, advanced analytics and machine learning.

A data lake may also store structured data, semi-structured data and binary data. Structured data may include row and column data retrieved from relational databases. Semi-structured data may include comma separated value ("CSV") files, log files, extensible markup language ("XML") files and java script object notation ("JSON") files. Binary data may include image files, audio files and audio-visual files.

However, there may be limited functionality within the data lake when compared to the capabilities of the source systems. Therefore, it may be further desirable to create frameworks that offer certain data manipulation capabilities that have been previously unavailable within the data lake.

A framework may be a platform for developing, hosting and executing software applications. A framework may include predefined classes and functions that can be used to process input, manage hardware devices and interface with system software. A framework may include one or more application programming interfaces ("APIs"). A framework may be used to execute a specific set of functions.

It may be yet further desirable to enable each department to access their data within the data lake.

It may be still further desirable to provide a system to migrate the data from the source systems to the data lake.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DISCLOSURE

Figure 1:
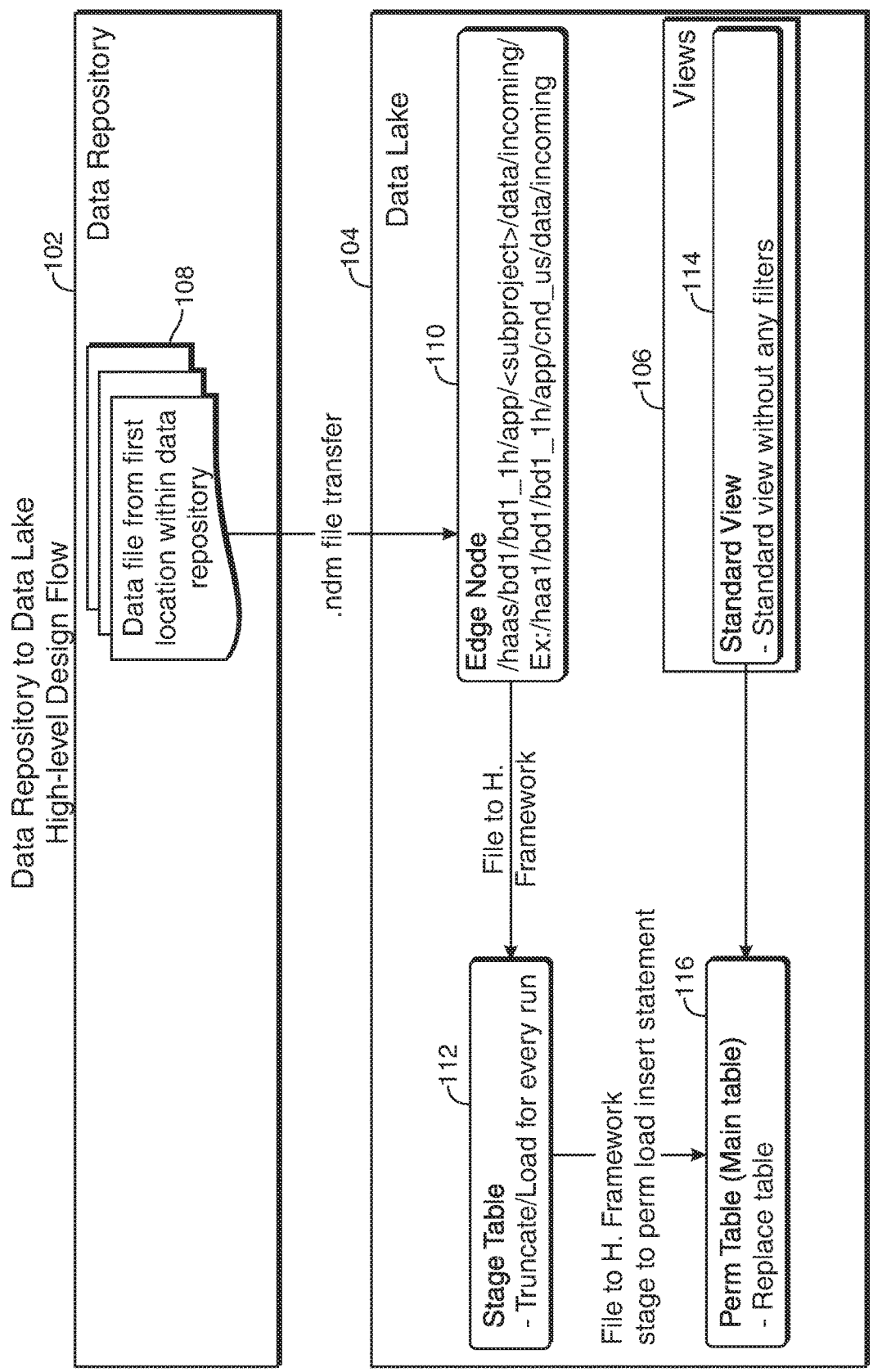
FIG. 1 shows an illustrative system in accordance with principles of the disclosure.

A system for migrating data from disparate source systems to an amalgamated data lake is provided. Such a system may provide, within the data lake, a 360-degree view of the data that had previously been housed in the disparate source systems. The 360-degree view may be understood, for the purposes of this application, to mean a comprehensive, single-location, homogeneous view of data from multiple source systems.

Examples of the disparate source systems may include a customer credit bureau refresh system, a consumer vehicle lending system, a card information system, a consumer loans risk operation system, a global wealth and investment management data provisioning point system and a mortgage data exchange operational data store.

A customer credit bureau refresh system may be a system that includes data relating to refresh information for a customer's credit. The refresh system may include data to be transmitted to credit bureaus. The refresh system may also include data received from credit bureaus.

The refresh system may also query credit bureaus for soft credit inquiries. Soft credit inquiries may identify recently incurred or undisclosed responsibilities. Soft credit inquiries may preferably not affect a customer or inquirer's credit score.

A consumer vehicle lending system may be a system that includes data relating to vehicle financing. The lending system may include data relating to lease buyouts, new car financing, used car financing and any other suitable vehicle financing data.

A card information system may be a system that includes data relating to card information. The card information system may include data relating to debit cards, credit cards, automated teller machine ("ATM") cards, cash cards, gift cards or any other suitable cards. The card information system may include data relating to card owners, card users, card transaction history or any other suitable card data.

A consumer loans risk operations system may be a system that includes data relating to consumer loans. The system may also calculate and store risk metrics relating to consumer loans. Such loans may include short term loans, long term loans, home improvement loans or any other suitable consumer loans. The risk operations system may include algorithms for determining risk at loan closings. The risk operations system may also include algorithms for determining risk periodically throughout the life of the loan.

A global wealth and investment management data provisioning point system may be a system that includes data relating to capital management. Such a system may include investment data, stock data and any other suitable data.

A mortgage data exchange operational data store may be a system that includes data relating to mortgages. Such a system may include mortgage data, property data, property tax data, escrow data and any other suitable data.

The migration and deployment system may provide a system to migrate the data from the source systems, such as those discussed above, to an amalgamated data lake. Such a migration may include transferring data between each source system and the data lake.

There may be technical problems with the standard data lake functionalities. Specifically, a data lake may be optimized for storing data, not displaying data. This may be because a data lake is a single location for huge amounts of diverse data. The data lake may be lacking the capabilities, or be optimized to, present data in easily consumable views that enable a user to appropriately identify, select and manipulate the data.

As such, there may be certain functionalities that are available in each of the above-mentioned source systems but are not available within the amalgamated data lake. Therefore, various add-on functionalities may be made available within the system. These add-ons may be implemented within the data lake to perform the functionalities that have previously not been available. These functionalities may include generating views for viewing the data included in the data lake, generating views for viewing historical snapshots of the data included in the data lake and generating condensed views of the data included in the data lake.

Each of these functionalities may be embodied in a framework. The frameworks may include a view creation framework, a snapshot load framework and a condenser framework.

A view creation framework may be used by the end user to view and query the data included in the data lake. The view creation framework may produce different views of the data included in the data lake's data tables. The different views may enable entity users to view and manipulate the data.

The view creation framework may perform numerous executables. The view creation framework may automate the logic needed to generate the views in order to be compatible with an environment that is special for storing data and running applications on clusters of commodity hardware. Such an environment may provide large amounts of storage for any data type. Such an environment may also provide enormous processing power and the ability to handle virtually limitless concurrent tasks or jobs. Such an environment may be a Hadoop TM environment, which may also be referred to herein as the Hadoop TM framework. The Hadoop TM environment may be an open-source software framework for storing data and running applications on clusters of commodity hardware. The Hadoop TM environment provides massive storage for any data type, as well as enormous processing power. Hadoop TM also provides the ability to handle virtually limitless concurrent tasks or jobs.

Previously, in order to generate multiple views, multiple developers were used. Multiple developers were previously used because a separate view application was generated for each source system. Therefore, each time a view application was created, a developer was used to create the custom application from the initial stages. It should be appreciated that more than one developer working on the same project may produce a greater risk of errors. Therefore, automating the logic and the views within the data lake may reduce the risk of errors. Additionally, once a view is generated, it can be used for multiple data groups within the data lake.

In addition, the automated logic and views may be replicated and reusable. The replicated and/or reusable automated logic and views may be utilized for various different types of data received from various source systems.

The view creation framework may include creating current and monthly views. Current views may be views of the data included in the data lake. Current views may point to current data, so the current view may display all of the current month's records. Monthly views may point to a specific point in time. Monthly views display all of the records for the requested month.

The view creation framework may also create views on tables that have been replaced with new data. The view creation framework may also create standard views on upsert permanent tables using a configuration file. Upsert tables may be tables that are condensed so that only the latest record in the table is visible.

The view creation framework may also create views on secured and non-secured schemas. The schemas may be based on metadata.

The view creation framework may also automate standard view creation with ranking and joins for upsert tables. The view creation framework may also add a to date function for source date columns. The to date function may mimic a to date function included in the one of the source systems. The view creation framework may format the data as per end user needs.

The view creation framework may also provide a bridge between the disparate source systems and the amalgamated data lake. The view creation framework enables users to view data from previously disparate systems in one location or view. Additionally, the view that point to the data lake may replicate views that pointed to each source system. As such, a user may be familiar with the views and re-training of users may be unnecessary.

Upon successful generation of the scheduled tables, the view creation framework may transmit an email alert. The email alert may include the list of tables that have been generated and are available for viewing. The generated tables may be made available for viewing through multiple user interfaces. The user interfaces may include general user interfaces, group entity user interfaces, entity specific user interfaces or department specific user interfaces. The user interfaces may be customizable to enable a user to customize the user interface. The generated tables may be queried by a query tool. Such a query tool may include Hue TM. Hue TM may be a user interface, or SQL assistant, for analyzing and querying data within a Hadoop TM data lake. Hue TM may make self-service data querying more easily accessible to organizations.

The snapshot load framework may provide the ability to users to view historic tables. The data may be archived to history tables at the end of every month. Users can access these records in order to analyze old records or transactions. The snapshot load framework may automate the process of loading data, such as daily transactions, into a history table from the main table every month.

Upon successful generation of the scheduled history tables, the snapshot load framework may transmit an email alert. The email alert may include the list of tables that have been generated and are available for viewing. The generated tables may be made available for viewing through multiple user interfaces. The user interfaces may include general user interfaces, group entity user interfaces, entity specific user interfaces or department specific user interfaces. The user interfaces may be customizable to enable a user to customize the user interface.

The condenser framework may include a process for condensing tables. Tables within the data lake may include numerous transactions.

New transactions may be appended to the tables daily. However, many times an end user desires to view only the latest record in a table. Therefore, the condenser framework performs an upsert process. The upsert process may truncate the old records and maintain only the latest record in a table.

Upon successful completion of the condenser process, the condenser framework may transmit an email alert. The email alert may include the condensed tables that have been generated and are available for viewing. The condensed tables may be made available for viewing through multiple user interfaces. The user interfaces may include general user interfaces, group entity user interfaces, entity specific user interfaces or department specific user interfaces. The user interfaces may be customizable to enable a user to customize the user interface. The generated tables may be queried by a query tool. Such a query tool may include Hue TM. Hue TM may be a user interface for analyzing and querying data within a Hadoop TM data lake.

It should be appreciated that the condenser process also improves performance and storage space of the condensed table.

It should also be appreciated that the user experience when accessing the data lake may be similar to the user experience when accessing the source systems. This may enable a seamless migration from the source systems to the data lake.

The following is a list of advantages associated with a data lake and the above-described frameworks.

The advantages may include reducing the manual effort. Manually producing the views may be time-intensive. This system automates that process and reduces bandwidth. Specifically, because Hadoop TM is a low-level framework and focuses on storing data, there may be limited resources made available for producing user-friendly views. Therefore, the above-described frameworks in addition to Hadoop may provide a user with the Hadoop advantages as well as automated user-friendly views.

The advantages may also include simplifying the user interface and process.

The advantages may also include the reusability of each process that is generated within the data lake. Therefore, once a first source system is migrated to the data lake, the process may be replicated in multiple source systems.

The advantages may also include a reduction in the amount of data. Therefore, the system may save resources, such as memory and processing power.

The advantages may also include improving performance of jobs and end user queries.

The advantages may also include data simplification. Data simplification may be specifically useful for audit and built-in enforcement of standards and policies.

The advantages may also include customizing the data output for end user needs.

Methods for generating structured views of raw data stored in a data lake are provided. Methods may include receiving relationally tabulated data at an edge-node. The tabulated data may be received from one or more sources. The sources may include relational databases positioned outside the data lake. The tabulated records may include duplicates. The edge-node may be positioned within the data lake. Methods may include identifying and eliminating duplicates.

Methods may include deconstructing the tabulated data into a main flat table. Deconstructing the tabulated table into a flat table may increase a size of the tabulated data. Deconstructing the tabulated table may include "flattening" the tabulated data. Flattening the tabulated data may include storing it in a single table, such as the main flat table. The main flat table may include all the information in the tabulated table, with little or no enforcement of structure. The absence of rigid structure may be referred to as denormalized schema.

An illustrative main flat table may be at least 2 petabytes in size. The main flat table may be larger in size than a corresponding relational database table storing the information included in the main flat table.

Flattening the tabulated data may result in a main flat table that requires more storage space than the tabulated data. The main flat table may require more storage space because it includes a row for each permutation of data referenced in the tabulated data.

The main flat table may be stored in the data lake in native format. A data lake may store information in an unstructured fashion (e.g., using denormalized schema). The data lake may store information in its generated form, without further processing or analysis. The data lake may receive and retain information from multiple sources in varying formats. Schemas, or structure, may only to be applied to information stored in the data lake when the information is ready to be consumed by an end user. The information is ready to be consumed by an end user when the end user requests the information.

Because data lakes do not include rigid structure therefore they may be more flexible. For example, changes to hardware or software operating in the data lake may be easier to implement compared to more rigid structures, such data warehouses or relational database management systems. Data lakes are more flexible and can be configured and reconfigured as needed for a specific project.

However, due to the unstructured nature of the information stored within a data lake, it may be technologically difficult for an end user to locate and organize desired information. Because the data lake stores information in its native form, the information in the data lake may include a variety of different and possibly incompatible formats. It may also be technologically difficult to format the desired information for presentation to an end user. Apparatus and method disclosed herein provide solutions to these technological challenges associated with data lakes.

Methods may include restructuring the main flat table. Restructuring the main flat table may include accessing information stored in the data lake. Restructuring the main flat table may include creating a first standard view table. The first standard view table may present information stored in the data lake in an organized and structured format. The first standard view table may include only unique records. The first standard view table may only include unique records added to the main flat table within a predetermined time window. An illustrative predetermined time period may be a month, week, day or any other suitable time period.

Methods may include receiving tabulated data, at an edge-node within the data lake. Methods may include deconstructing the tabulated data into a main flat table. Methods may include storing the main flat table in the data lake.

Methods may include executing one or more frameworks within the data lake. A framework may be a software application. For example, a framework may be written in UNIX and/or python programming languages. Software applications may be operational with distributed computing environments where tasks are performed by remote processing devices that are linked through a communications network. Such distributed processing may include distributed storage and processing of "big data." Big data may include information stored in a data lake.

Software applications disclosed herein, such as a framework, may perform distributed storage and processing of information stored in the data lake using programming models that apply parallel, distributed algorithm across a cluster of connected computer systems. Such a programming model may utilize a map reduce programming model and associated libraries.

A map reduce program model and associated libraries may execute various tasks in parallel, manage communications and data transfers between system components, and implement redundancy and fault tolerance at the software application level. A map reduce program model may divide a computing task into small jobs and assign each small job to a different computer. The map reduce program model may collect the results of each small job from each computer and form a result dataset based on the results of each small computing job.

An illustrative software application that utilizes a map reduce model and associated libraries includes Apache Hadoop TM provided by the Apache Software Foundation of Wakefield, Mass.

Methods may include, on demand, executing a view creation framework. The view creation framework may create, based on the main flat table, a standard view table consisting of only unique records. When a quantum of time has elapsed from a time the standard view table was been created, methods may include executing a snapshot load framework. The snapshot load framework may load records referenced in the standard view table into a history table.

The snapshot load framework may only load records referenced in the standard view table that are associated with a time stamp prior to a start of the quantum of time. The snapshot load framework may only load records referenced in the standard view table that are associated with a time stamp prior to creation of the standard view table. In some embodiments, the standard view table may be populated with pointers for locating records stored in the data lake.

Methods may include storing the history table in the data lake. Methods may include using a viewing tool running in the data lake, generating tabulated views of records referenced in the standard view table. Methods may include using a viewing tool running in the data lake, generating tabulated views of records referenced in the history table. The viewing tool may be configured to pull records stored in the in the main flat table using metadata in the standard view and/or history tables.

Methods may include using object-oriented programming to locate target records stored in the data lake. Methods may utilize Hibernate ORM TM and its Hibernate Query Language ("HQL") (e.g., an .hql file) to formulate queries to locate target records stored in the data lake. Methods may include using classes and properties to express queries for locating records in the data lake.

Methods may include transferring a first sub-set of the tabulated data from a first database system into the data lake. The first database system may be located outside the data lake. At the edge-node, methods may include receiving a second sub-set of the tabulated data from a second database system. The second databased system may be located outside the data lake. Methods may include combining records from the first and second sub-sets to create the main flat table.

Methods may include dispersing storage of the main flat table across two or more computers using a map reduce program model operating within the data lake. Methods may include dispersing computation of the standard view table and the history table across two or more computer systems within the data lake. Each computer system may be a commodity server. Commodity servers may refer to servers built from off-the-shelf, widely available components.

Methods may include dynamically adding or removing one or more of the two or more computer systems from the data lake without interrupting creation of the standard view table or the history table. Methods may include at an application layer, detecting and handling failures of the snapshot load framework to load records into the history table. Methods may utilize a map reduce model and associated libraries provided by Apache Hadoop TM.

A system of frameworks for generating structured views of data stored within the data lake is provided. The system may include a main flat table. The main flat table may be stored in the data lake in native format. The system may include a view framework. The view framework may be configured to generate a standard view table. The view framework may generate the standard view table by extracting metadata from the main flat table. The standard view table may provide a structured view of records added to the data lake within a predetermined time period.

The system may include a snapshot load framework. The snapshot load framework may be configured to operate on a system defined schedule. The snapshot load framework may be configured to create a history table. The snapshot load framework may archive records referenced in the standard view table in the history table.

The system may include a viewing module. The viewing module may be configured to generate a display of records referenced in the standard view table. The viewing module may be configured to generate a display of records referenced in history table. The viewing module may be configured to generate a display of records based on metadata included in the standard view or history tables. The viewing module may be configured to located records included in the main flat table based on the metadata extracted from the standard view or history tables.

The snapshot load framework may be configured to archive the records referenced in the standard view table by storing metadata, associated with records stored in the main flat table, in the history table. The metadata may be used to access the underlying records stored in the main flat table.

The standard view table may be a first standard view table. The snapshot load framework may be further configured to call the view framework to generate a second standard view table after creating the history table. The view framework may be configured to generate the second standard view table based on records added to the main flat table after creating the history table. The second standard view table may reference records added to the data lake after creation of the history table. The second standard view table may reference records added to the data lake that have not yet been archived.

The snapshot load framework may be configured to generate a reporting email confirming successful creation of the history table.

Successful creation of the history table may correspond to a successful archiving of information included in the standard view table. After a successful archiving, the history table may provide access to an end user, of a sub-set of information included in the main flat table. The sub-set may be defined based on a time period. End user interested in information generated during the time period may utilize the history table. Running end user queries on one or more history table may be faster and more computationally efficient than running the queries on the main flat table.

The snapshot load framework may archive information into history tables based on a system defined schedule. An illustrative system defined schedule may archive records referenced in the standard view table at least once a month. The snapshot load framework may be configured to create a new history table each time records are archived from the standard view table.

A system of frameworks for generating tabulated views of information stored in native format within a data lake is provided. The system may include a view framework. The view framework may be configured, in response to a user request, to generate a standard view table. The view framework may generate the standard view table based on a subset of records included in a main table stored in the data lake.

The subset of records may be defined based on a time/date stamp associated with the records. For example, the subset may be defined based on when the records were captured by the relational database systems outside the data lake. The subset may be defined based on when the records were added to the data lake.

In some embodiments, the view framework may generate the standard view table by extracting records from the main flat table. In some embodiments, the view framework may generate the standard view table by extracting metadata from the main table.

The system may include a snapshot load framework. The snapshot load framework may be configured to create a history table. The snapshot load framework may be configured to archive, in the history table, records included in the standard view table. The snapshot load framework may be configured to archive, in the history table, metadata included in the standard view table.

The snapshot load framework may add a partition to the main table based on the metadata/records archived in the history table. The partition may provide a marker, within the main table indicating when a history table has been created and which records have been included in the history table. The partitions may link one or more history tables to information stored in the main table.

An end user may run a query or analysis on the history table, and based on the results obtained from the history table, only access the main table to obtain the resultant records. Running queries or analyses on the history table may be faster and computationally more efficient than running the same queries or analyses on the main table. The main table may be orders of magnitude large than a history table.

The system may include a viewing module. The viewing module may be configured to generate a tabulated view of records referenced in the history table. The viewing module may generate the tabulated view by accessing records stored within a target partition added to the main table. The history table may include a reference to the target partition.

The system may include an application program interface ("API"). The API may be configured to receive a query formulated based on the tabulated view of records referenced in the history table. The API may be configured to respond to the query by accessing the history table. In some embodiments, the API may be configured to pull records from the main table that referenced by the history table and responsive the received query.

In some embodiments, the API may be configured to obtain metadata stored in the history table and responsive the query. The metadata may direct the API to records stored within a target partition in the main table.

Records may be added to the main table daily. The snapshot load framework may be configured to create a new history table each month. The snapshot load framework may be configured to archive metadata in the new history table corresponding to records added to main table during the previous month.

The snapshot load framework may be configured to instruct the viewing module to generate a tabulated view of records referenced in each new history table created. The snapshot load framework may be configured to generate a reporting email confirming successful creation and archiving of metadata in each new history table.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows an illustrative diagram. The illustrative diagram shows a high-level design flow of a replace command.

Data from source system 102 may be transferred to data lake 104. Data lake 104 may be a Hadoop TM data lake. A Hadoop TM data lake may utilize specialized software to generate massive amounts of computing power from multiple average capability computers. The specialized software may distribute computing tasks across multiple nodes. The nodes may be linked. The nodes may include average computing capabilities.

This method of distributed processing may be efficient. One reason this method may be efficient may be because in the event of a failure on a node, the data lake may remain operational.

Source system 102 may be a card information system. Data files 108 may be transferred from source system 102 to edge node 110. Edge node 110 may be within data lake 104. It should be appreciated that, in some embodiments, edge node 110 may receive all of the files from source system 102.

The data transfer between source system 102 and data lake 104 may be a network data mover ("NDM") data transfer. NDM may be a software product for transferring files between mainframe computers and midrange computers.

Edge node 110 may transfer files to stage table 112, within data lake 104. The transfer between edge node 110 and stage table 112 may be described as file to H. Framework. File to H. Framework may be understood to mean processing a file within the data lake in order to store the file within the data lake. An H. Framework may be a Hadoop TM framework, a data lake or other suitable framework. Stage table 112 may be the first location at which unstructured and/or unorganized data received from predetermined relational database management system is structured is structured into tables. The predetermined relational database management system may be configured to run on multiple virtual storage locations. The predetermined relational database management system may be DB2 TM. DB2 TM may include structured and/or unstructured data files.

In some embodiments, the files transmitted to stage table 112 may be metadata files. The metadata files may include data about the data files received from source system 102. An example of metadata included in the metadata files may include file name, file size, file origin or any other suitable metadata. In certain embodiments, the transmitted data may include data included in data files. Such data may be a portion, or the entirety of the data included in the data files.

Stage table 112 may receive metadata and/or data from edge node 110 included in the data lake. Stage table 112 may be the first step in which data from data files are structured within a table. Stage table 112 may truncate and/or load the metadata for every run. Upon solidifications of the data within stage table 112, the stage table may generate a permanent load insert statement. The permanent load insert statement may combine multiple solidified data elements that have been received at stage table 112. The permanent load insert statement may be one or more .hql files.

The permanent load insert statement may be transmitted to permanent table or main table 116. Permanent table or main table 116 may receive insert statements from the stage table. Permanent table or main table 116 may be replaced with the updates received from stage table 112. Permanent table or main table 116 may represent a permanent record of the current data included in each edge node.

The view creation framework may include a view process to enable users to view the data included in permanent table or main table 116. The views may be shown at 106. The views shown may include a standard view 114. Views 106 may point to permanent table 116. Therefore, views 106 may display the data included in permanent table 116. Standard view 114 may include a view of the data without any filters or queries.

Some views may enable filters and/or queries. The filters and/or queries may narrow the data that is viewed. Different views may give a user the ability to view different aspects of the data.

Figure 2:
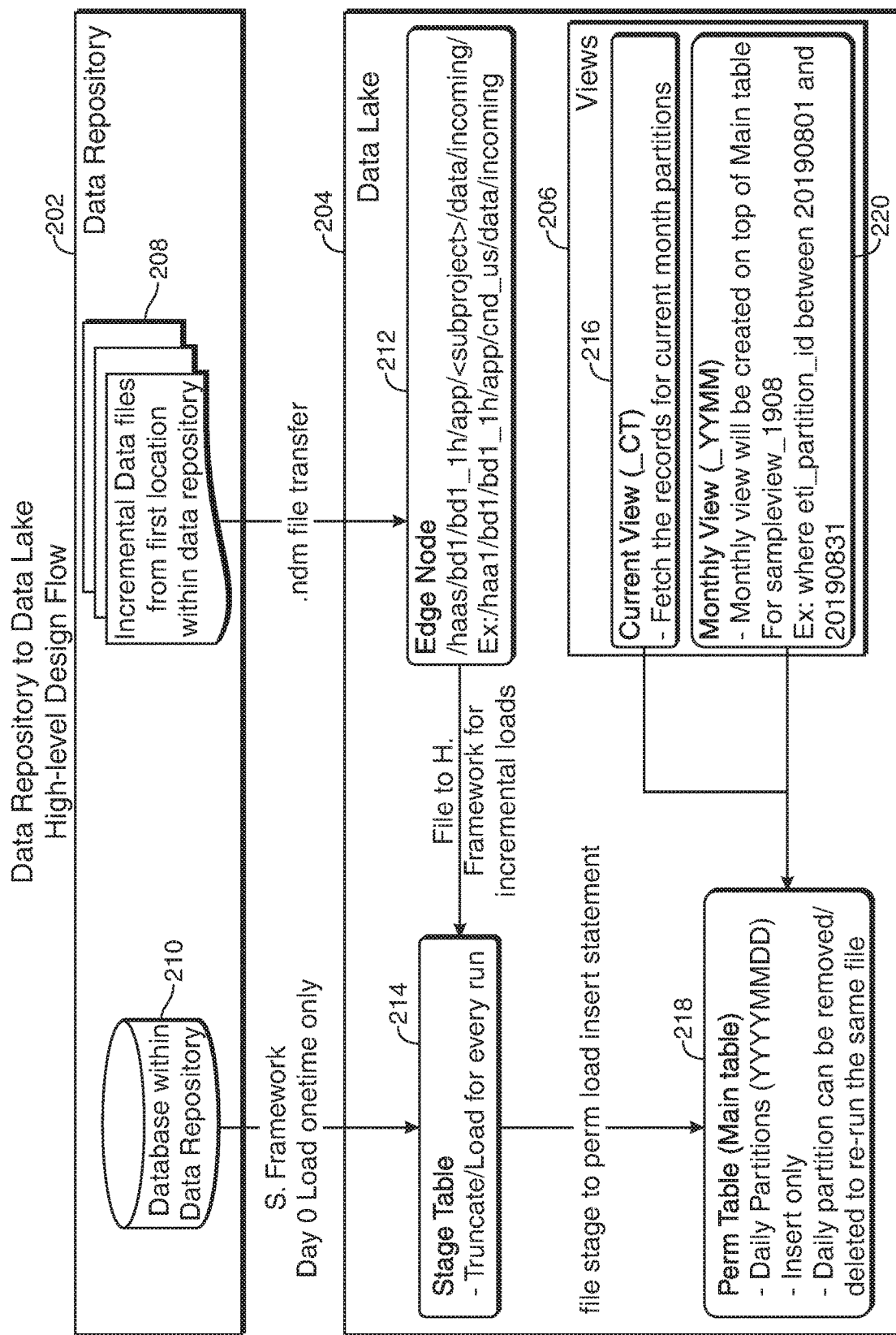
FIG. 2 shows an illustrative system in accordance with principles of the disclosure.

FIG. 2 shows another illustrative diagram. The illustrative diagram shows a high-level design flow. The high-level design flow includes source system, shown at 202 and amalgamated data lake, shown at 204.

Source system 202 may include data. The raw data received at source system 202 may be shown at 208 as incremental data files from DB2. Prior to utilizing the data lake, a relational database management system, shown at 210, may be used to store structured data that has been culled from data files 210. Such a relational database management system may be a Teradata TM database. Therefore, database 210, includes data that has been structured within tables. Once incremental data files from DB2 208 are structured and positioned within tables in Teradata database 210, the incremental data files from DB2 may be archived.

Upon the initiation of data lake 204, incremental data files from DB2 may be transferred directly to edge node 212. However, because Teradata 210 also includes structured tables of archived data files, the tabulated data from Teradata 210 may also be transferred to stage table 214.

In addition, during the migration process, the data files from DB2 may continue to be transferred to Teradata database 210. This may result in duplicate data within stage table 214. Stage table 214 may include data duplicate removal processes for removing the duplicate data. Additionally, data files received from DB2 may also include duplicate data. As such, this duplicate data may be easily removed once the data files are transferred into structured data files.

Edge node 212 may transfer data or metadata relating to incremental data files to stage table 214. Stage table 214 may also receive tabulated data from Teradata database 210, as described above. It should be appreciated that the data transfer between Teradata database 210 and stage table 214 may utilize a command-line interface application for transferring data between relational databases and environments, such as Hadoop TM. Such an interface may be referred to as an S. Framework. Such an interface may be a Sqoop TM framework. The transfer between Teradata database 210 and stage table 214 may also load one time only at Day 0. The Day 0 load may be executed once the migration from the data repository system is archived. As such, upon the day 0 load data from the DB2 may be imported directly into edge node 212 instead of the DB2.

Stage table 214 may truncate and/or load for every run. Stage table 214 may tabulate unstructured data received from edge node 212. Stage table 214 may also remove duplicates. Duplicates may be the same data included in both tabulated data received from Teradata 210 and unstructured data received from edge node 212. Duplicates may also include multiple data records, each of which correspond to the same data record, however, include a different time stamp. As such, the data record with the most recent time stamp may be maintained, and all other data records—i.e., data records with historic time stamps—may be removed during the duplicate removal.

Stage table 214 may include the most recent data records to be appended to the permanent table. Stage table 214 may combine the structured data into a permanent load insert statement. As such, the most recent data records may be formulated into a permanent load insert statement. The permanent load insert statement may be in the formation of an .hql file. The permanent load insert statement may be inserted into permanent table (main table), shown at 218. As such, the records included in the permanent load insert statement may be appended to the main table.

Permanent table (main table) 218 may include daily partitions. The daily partition may be removed and/or deleted to rerun the same file. Permanent table 218 may receive insert statements.

Views 206 may enable a user to view the contents of the permanent table 218. Views 206 may point to permanent table 218. Views 206 may retrieve data from permanent table 218 for end user viewing. Therefore, the data included in permanent table 218 may be visible by an end user.

Views 206 may include current view 216 and monthly view 220. Current view 216 may point the current month. Because each month may be partitioned from the other months, the current view pointer may point to the current month.

Monthly view 220 may be operable to receive parameters. The parameters may be month and year parameters. The parameters may be received in a year, year, month, month (YYMM) format. Monthly view 220 may receive the month and year parameters. Monthly view 220 may access permanent table 218 to retrieve the records included in the partition of the month that corresponds to the received parameters. Monthly view 220 may display the retrieved records to the end user.

Figure 3A:
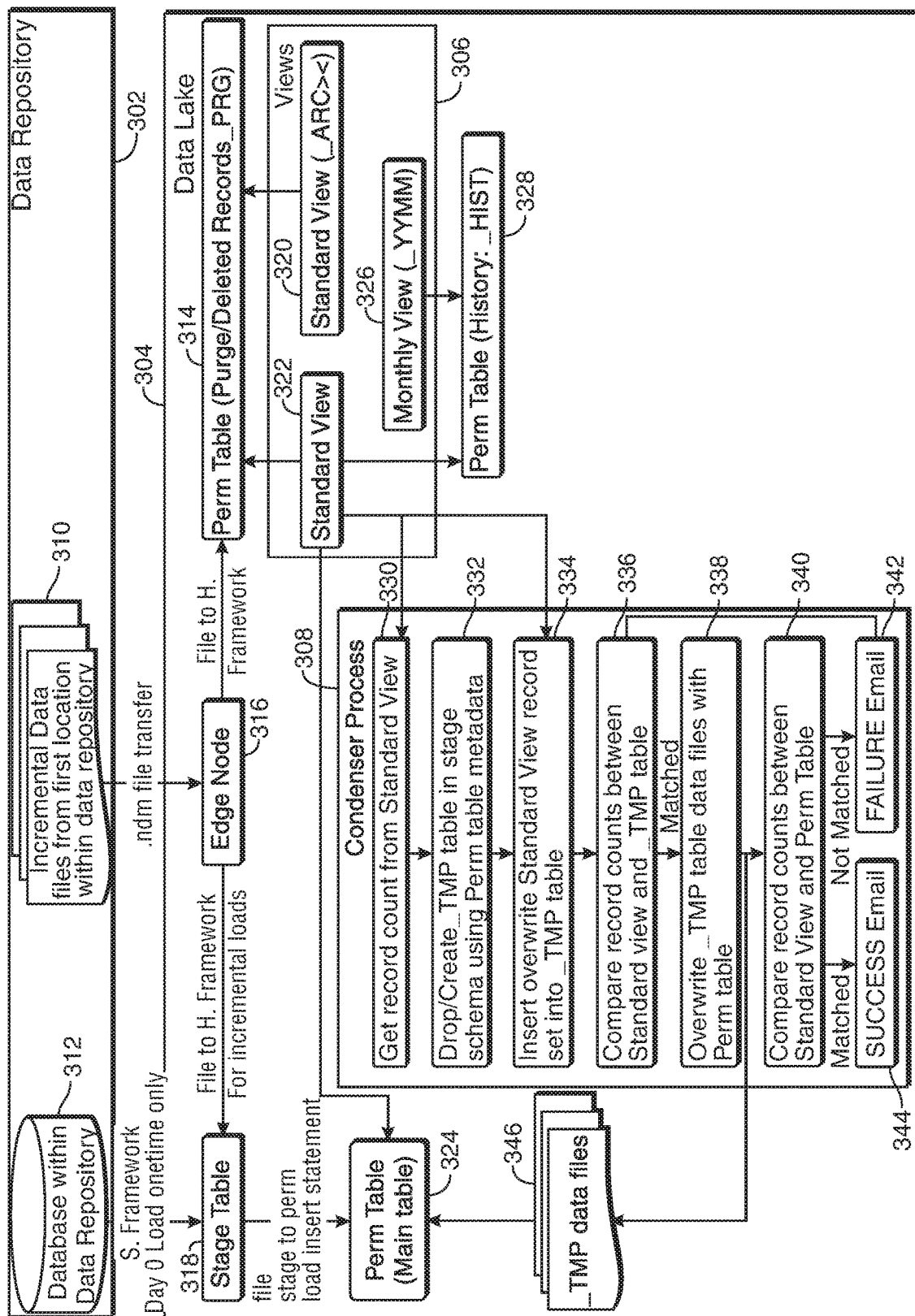
FIG. 3A shows an illustrative system in accordance with principles of the disclosure.
Figure 3B:
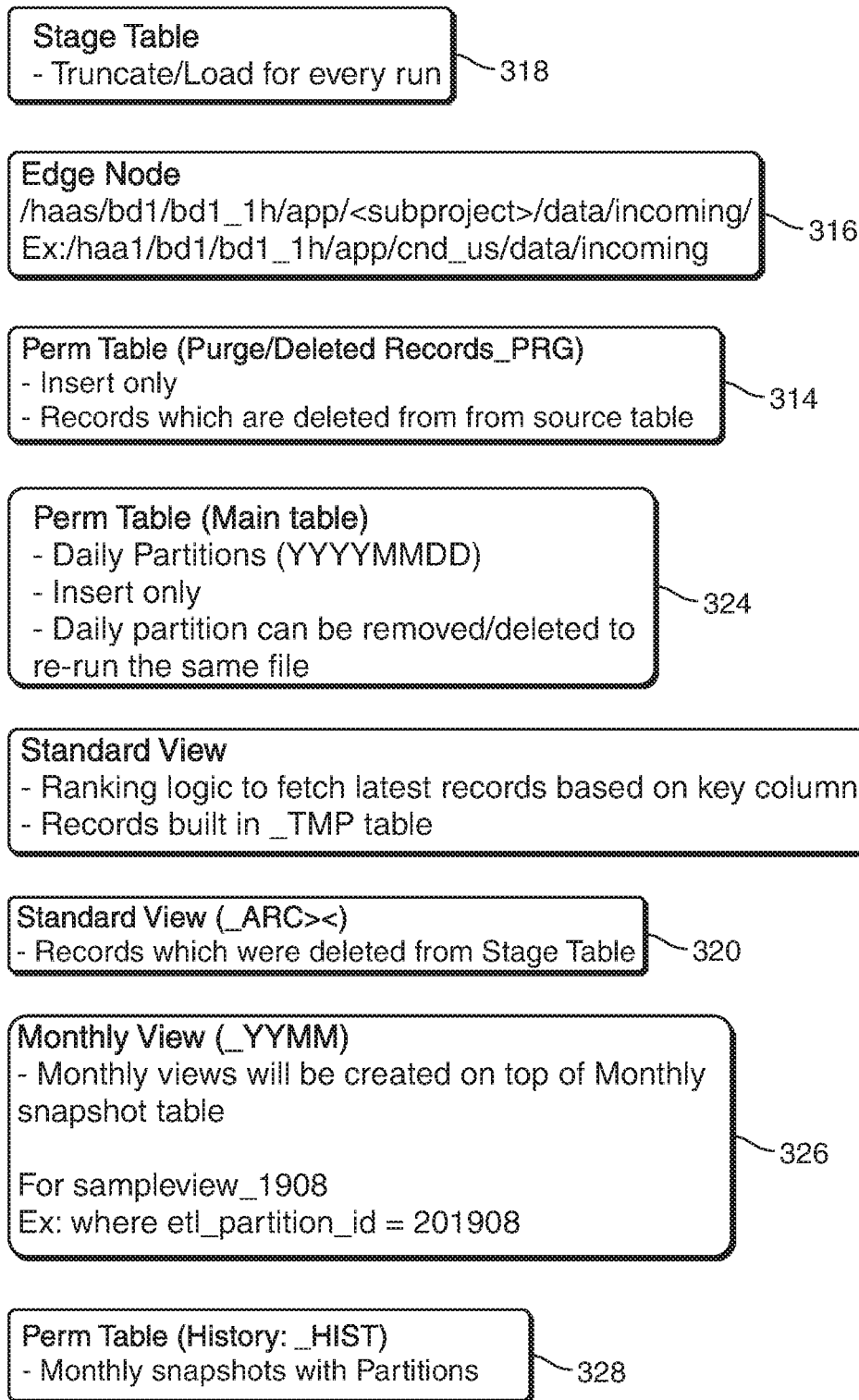
FIG. 3B shows an illustrative system in accordance with principles of the disclosure.

FIG. 3A and FIG. 3B show an illustrative diagram. FIG. 3A shows the flow between components. FIG. 3B includes details on some of the components included in the FIG. 3A.

As discussed above, source system 302 may transmit data to data lake 304. Unstructured data may be migrated from incremental data files from DB2, as shown at 310, to edge node 316. The data transfer between data files 310 and edge node 316 may be an NDM file transfer.

Tabulated data may also be migrated from Teradata database 312 directly to stage table 318. The data transfer between Teradata database 312 and stage table 318 may utilize the Sqoop TM framework. The data transfer between Teradata database 312 and stage table 318 may be a day zero one time load.

The unstructured data received at edge node 316 may include various categories of labeled data. One category of labeled data may include data that is in-use. Another category of labeled data may include data that was marked within source system 302 to be deleted.

The in-use data may be transferred from edge node 316 to stage table 318. The in-use data may be structured at stage table 318. After structuring, in-use data may be formed into load insert statements. The load insert statements may be .hql files. The load insert statements may be loaded into permanent table (main table) 324.

The data that was marked to be deleted may be transferred from edge node 316 to permanent table (purged/deleted records) 314. Permanent table (purged/deleted records) 314 may include all of the purged and/or deleted records.

Permanent table (history) 328 may include historical data. Each month, the standard view of the month may be processed and loaded to permanent table (history) 328. Permanent table (history) 328 may maintain a historical log of the records.

View 306 may include a plurality of views. Standard view 322 may point to permanent table (main table) 324, permanent table (purged/deleted records) 314 and permanent table (history) 312. Therefore, standard view 324 may display substantially all of the available data within data lake 304.

Standard view 320 may point to permanent table (purged/deleted records) 314. Therefore, standard view 320 may display the purged and/or deleted records.

Monthly view 326 may point to permanent table (history) 312. Therefore, monthly view 326 may display the historical records of a particular historical month. The particular historical month to be displayed may be received from a user. The month may be received from a user in the year, year, month, month (YYMM) format.

Condenser process 308 may be a process used to truncate tables in order to enable an end user to view only the latest record. Condenser process may also be known as an upsert process.

Condenser process may retrieve a record count from standard view 322, as shown at 330. Condenser process may drop and/or create a temporary table (_TMP table) in stage schema using permanent table metadata, as shown at 332. Condenser process may insert overwrite standard view record set into the temporary table, as shown at 334.

Condenser process may compare the record counts between the standard view and the temporary table, as shown at 336. If the record counts between the standard view and the temporary table do not match, a failure email may be transmitted, as shown at 342.

If the record counts between the standard view and the temporary table match, the condenser process may overwrite the temporary table with data files from the permanent table, as shown at 338. Temporary data files 346 may retrieve the files for the rewrite from permanent table (main table) 324.

After the overwriting, the condenser process compares the record counts between the standard view and the permanent table, as shown at 340. If the record counts between the standard view the permanent table match, the condenser process generates a success email, as shown at 344. If the record counts between the standard view and the permanent table do not match, the condenser process generates a failure email, as shown at 342.

The record count, within the condenser process, may be checked two times to ensure the appropriate record count. It is important that the count is correct because the upsert function makes only the top record visible. Therefore, if there is an incorrect count, the incorrect record will be the top record, and as such, the incorrect record will be visible.

Figure 4:
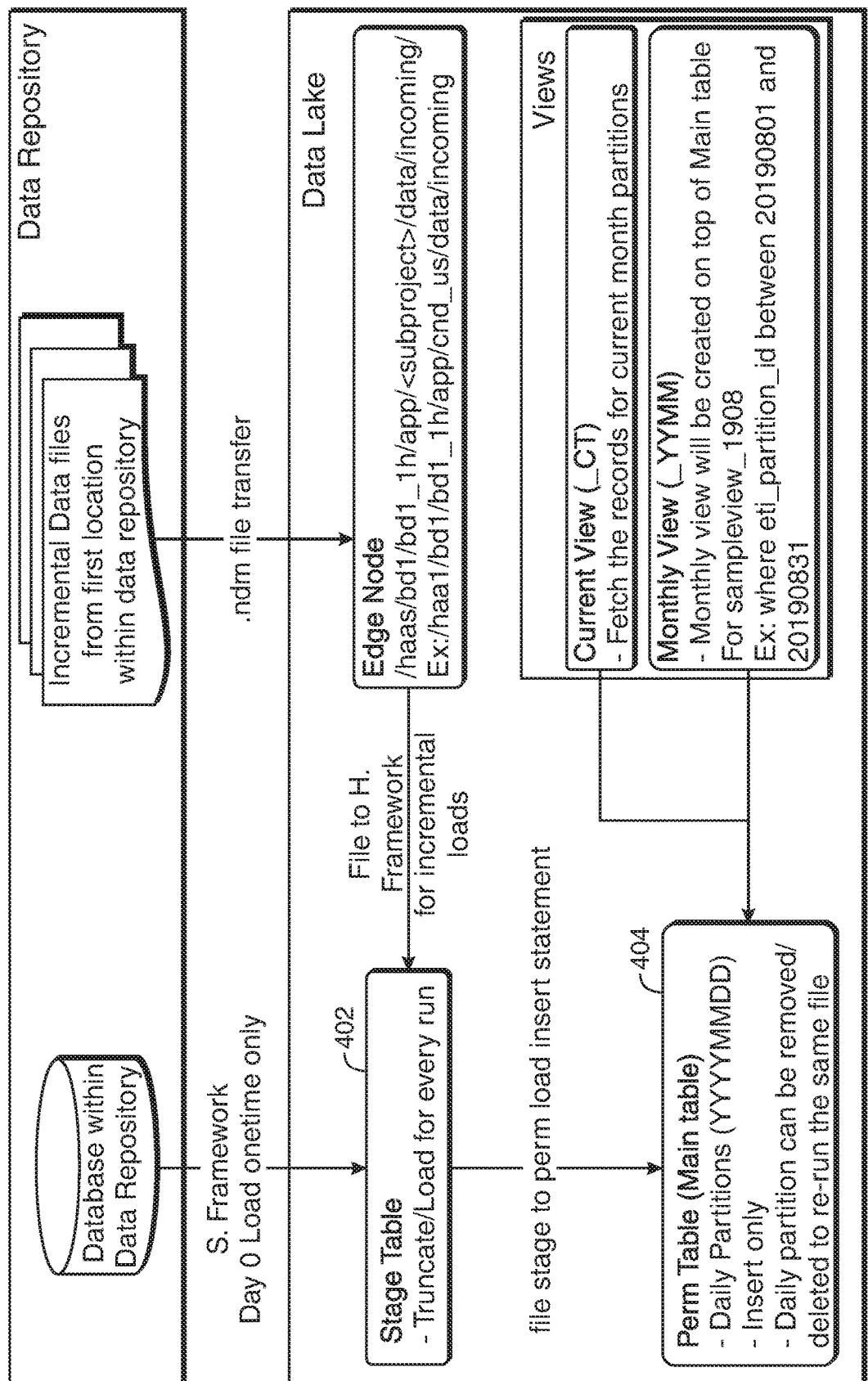
FIG. 4 shows an illustrative system in accordance with principles of the disclosure.

FIG. 4 shows an illustrative diagram. The illustrative diagram may correspond to a design flow of an append command. In the append command, the data being transmitted from stage table 402 to permanent table 404 may be appended to the data already in permanent table 404. It should be appreciated that this is different from the replace command, where the data in the stage table replaces the contents of the permanent table.

Figure 5:
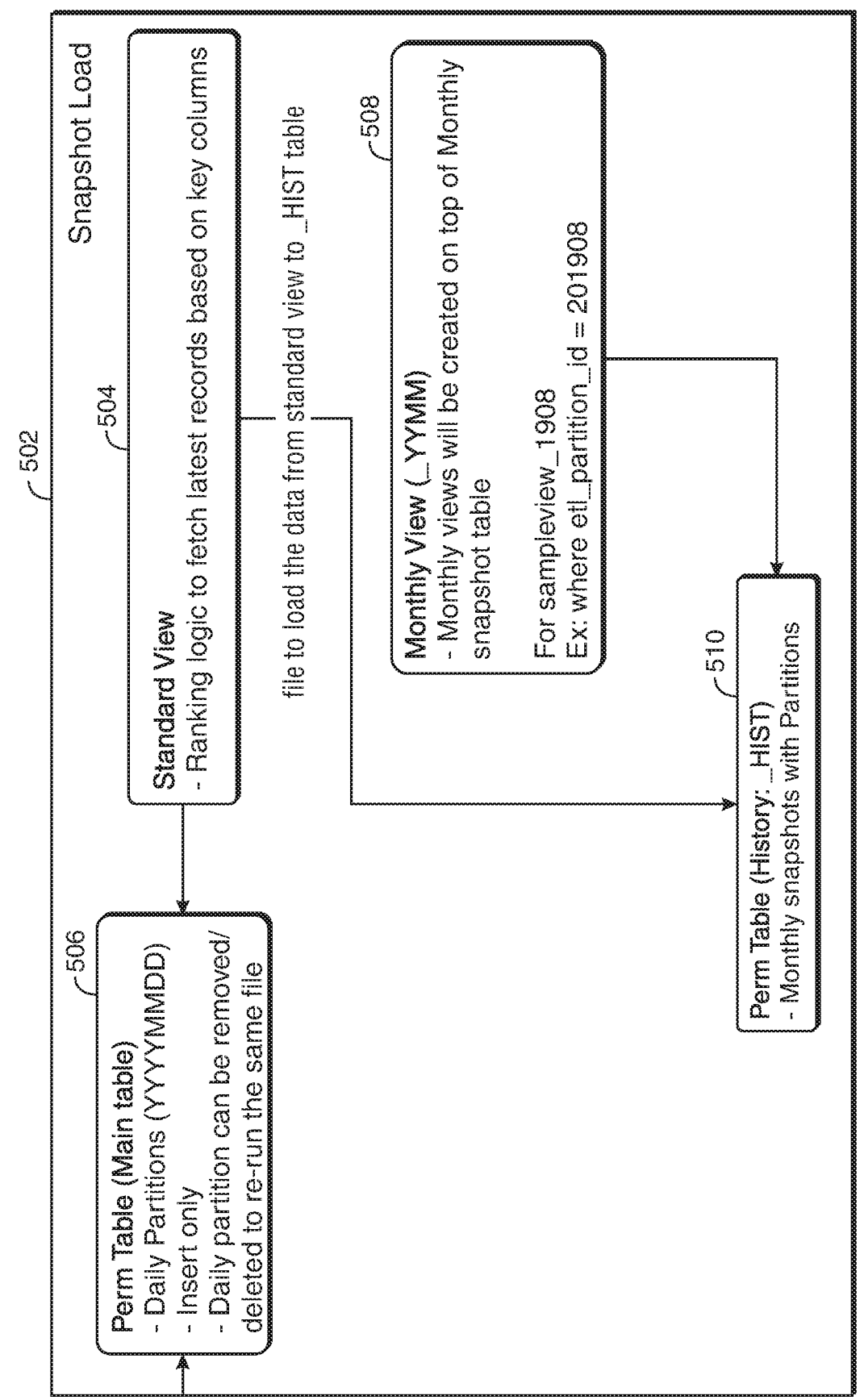
FIG. 5 shows an illustrative system in accordance with principles of the disclosure.

FIG. 5 shows an illustrative diagram. The illustrative diagram shows snapshot load framework 502. Snapshot load framework 502 includes standard view 504. Standard view 504 points to, and joins, permanent table (main table) 606 and permanent table (history table) 510. Standard view 504 may display current data and historical data to an end user.

Monthly view 508 point to permanent table (history table) 510. Monthly view 508 may display historical data based on a parameter received from an end user.

Figure 6:
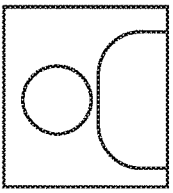
FIG. 6 shows illustrative output of an illustrative system in accordance with principles of the disclosure.

FIG. 6 shows illustrative email diagram 602. Email diagram 602 may demonstrate a successful completion of a view tables process. Email diagram 602 may be transmitted to an end user.

Email diagram 602 may include a date and time, shown at 604. Date and time 604 may be the date and time of the transmission of the email.

Email diagram 602 may also include an email address or email address alias, shown at 606. Email address or email address alias 606 may be the email address or email address alias from which the email was transmitted.

Email diagram 602 may also include a subject line, shown at 608. Subject line 608 may include details relating to the successful view tables process. Subject line 608 demonstrates that folder XX view tables have been created successfully.

Email diagram 602 may also include an email recipient line, shown at 610. Email recipient line 610 may include a recipients or recipient groups to which email 602 was transmitted. The recipients of email 602 include XXX support team and XXX development team.

Email diagram 602 may also include the view tables that have been created, as shown at 612. Email diagram 602 shows that folder XX view tables including tables 1900-1908 have been created.

Figure 7:
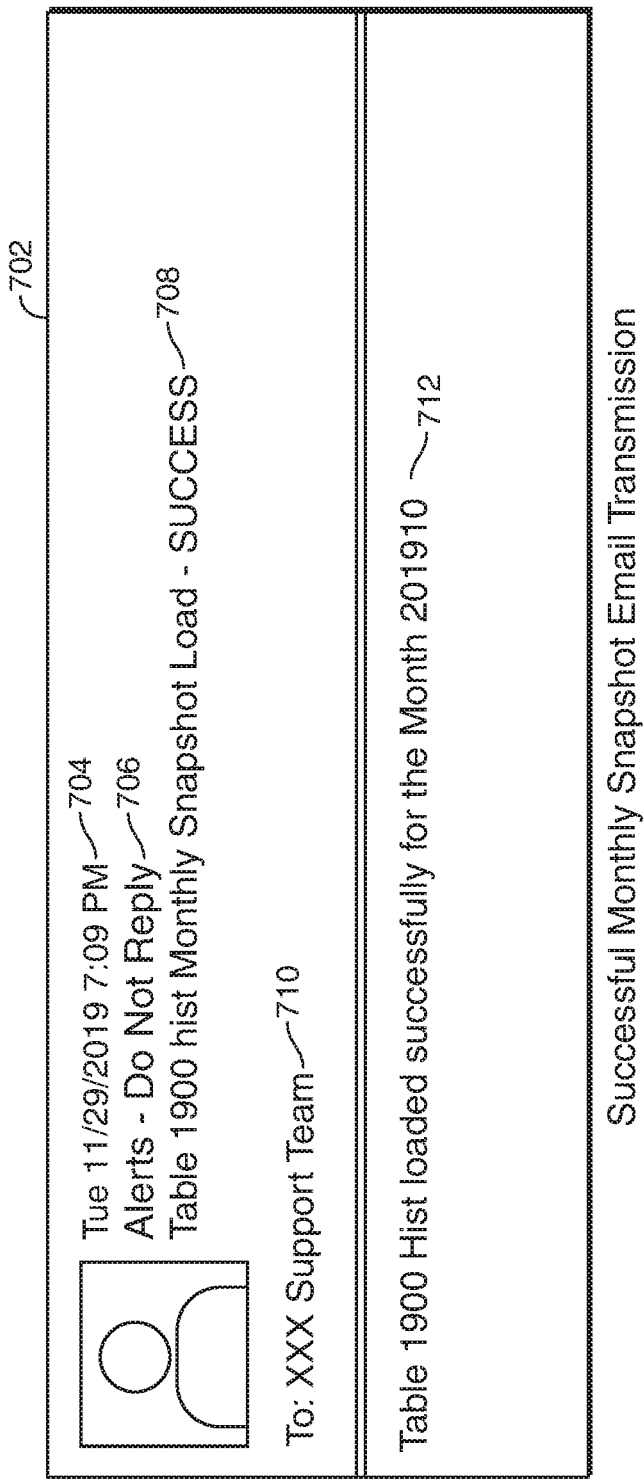
FIG. 7 shows illustrative output of an illustrative system in accordance with principles of the disclosure.

FIG. 7 shows illustrative email diagram 702. Email diagram 702 may demonstrate a successful completion of a monthly snapshot email transmission. Email diagram 702 may be transmitted to an end user.

Email diagram 702 may include a date and time, shown at 704. Date and time 704 may be the date and time of the transmission of the email.

Email diagram 702 may also include an email address or email address alias, shown at 706. Email address or email address alias 706 may be the email address or email address alias from which the email was transmitted.

Email diagram 702 may also include a subject line, shown at 708. Subject line 708 may include details relating to the monthly snapshot load process. Subject line 708 demonstrates that the historical monthly snapshot for table 1900 has been loaded and/or created successfully.

Email diagram 702 may also include an email recipient line, shown at 710. Email recipient line 710 may include a recipients or recipient groups to which email 702 was transmitted. The recipients of email 702 include XXX support team.

Email diagram 702 may also details relating to the historical snapshot loading, as shown at 712. Email diagram 702 shows that the historical monthly snapshot of table 1900 has been loaded successfully for the month of 10-2019.

Figure 8:
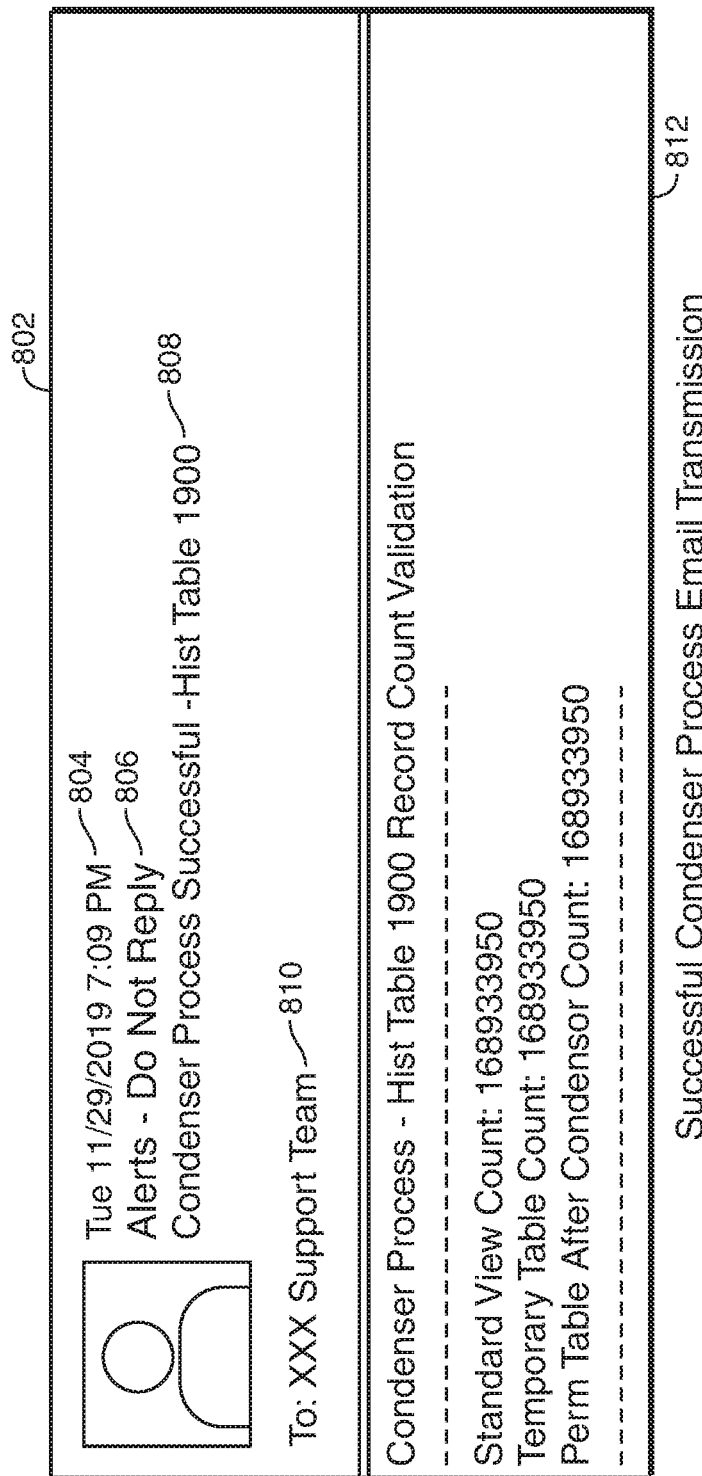
FIG. 8 shows illustrative output of an illustrative system in accordance with principles of the disclosure.

FIG. 8 shows illustrative email diagram 802. Email diagram 802 may demonstrate a successful completion of a condenser process. Email diagram 802 may be transmitted to an end user.

Email diagram 802 may include a date and time, shown at 804. Date and time 804 may be the date and time of the transmission of the email.

Email diagram 802 may also include an email address or email address alias, shown at 806. Email address or email address alias 806 may be the email address or email address alias from which the email was transmitted.

Email diagram 802 may also include a subject line, shown at 808. Subject line 808 may include details relating to the condenser process. Subject line 808 demonstrates that the condenser process for Historical table 1900 has been completed successfully.

Email diagram 802 may also include an email recipient line, shown at 810. Email recipient line 810 may include a recipients or recipient groups to which email 802 was transmitted. The recipients of email 802 include XXX support team.

Email diagram 802 may also details relating to the condenser process of historical table 1900, as shown at 812. As shown at 812, the condenser process has been successful for historical table 1900. Also, as shown at 812, a record count validation of the standard table, temporary table and the permanent table after condenser count is shown. The record count may show that the count has remained the same within the various table views.

Figure 9:
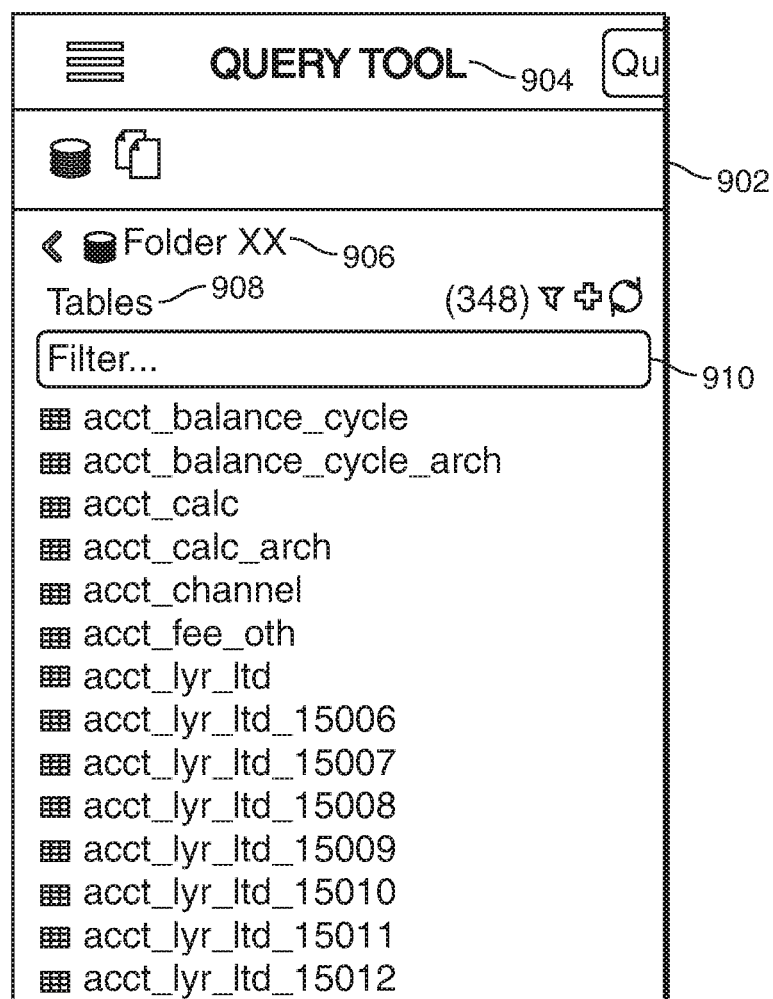
FIG. 9 shows illustrative output of an illustrative system in accordance with principles of the disclosure.

FIG. 9 shows an illustrative query tool 902. Query tool 902 may be used to query tables within the data lake. Query tool 902 may include header 904. Query tool 902 may display a specific folder to query, as shown at 906. Query tool 902 may include a list of tables included in the folder, as shown at 908. Query tool 902 may include a filter box, as shown at 910. Filter box 910 may enable a user to filter the list of tables.

Thus, apparatus and methods for a SNAPSHOT LOAD FRAMEWORK are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system of frameworks operating in a data lake for generating structured views of information stored within the data lake, the system comprising:
 a main flat table stored in the data lake in native format;
 a view framework configured to generate a first standard view table that references first records stored in the main flat table by extracting metadata from the main flat table;
 a snapshot load framework configured to:
  operate on a system defined schedule and create a history table that archives a subset of the first records referenced in the first standard view table; and
  call the view framework to generate a second standard view table that references second records added to the main flat table after creating the history table; and
 a viewing module configured to generate a display of:
  the first records based on the metadata included in the first standard view table:
  the second records based on metadata included in the second standard view table; and
  the subset of the first records based on metadata included in the history table.

2. The system of claim 1, the snapshot load framework is further configured to archive the subset of the first records referenced in the first standard view table by storing, in the history table, metadata associated with the subset of the first records stored in the main flat table.

3. The system of claim 1, wherein:
 the main flat table is at least 2 petabytes in size; and
 the main flat table is larger in size than a corresponding relational database table storing the records included in the main flat table.

4. The system of claim 1 wherein the snapshot load framework is configured to generate a reporting email confirming successful creation of the history table.

5. The system of claim 1, wherein the system defined schedule is configured to archive a new subset of the first records referenced in the first standard view table at least once a month.

6. The system of claim 5, wherein the snapshot load framework is configured to create a new history table each time the new subset of the first records is archived from the first standard view table.

7. A system of frameworks operating in a data lake for generating structured views of information stored within the data lake, the system comprising:
   a main flat table stored in the data lake in native format;
   a view framework configured to generate a standard view table by extracting metadata from the main flat table;
   a snapshot load framework configured to operate on a system defined schedule and create a history table that archives a subset of the metadata stored in the standard view table; and
   a viewing module configured to generate a display of:
      the standard view table based on the metadata included in the standard view table and records included in the main flat table; and
      the history table based on the subset of the metadata and records included in the main flat table;
   wherein:
      the main flat table is at least 2 petabytes in size; and
      the main flat table is larger in size than a corresponding relational database table storing the records included in the main flat table.

8. The system of claim 7, wherein the standard view table is a first standard view table, the snapshot load framework is further configured to call the view framework to generate a second standard view table after creating the history table.

9. The system of claim 8, wherein the view framework is configured to generate the second standard view table based on the records included in the main flat table and added to the main flat table after creating the history table.

10. The system of claim 7 wherein the snapshot load framework is configured to generate a reporting email confirming successful creation of the history table.

11. The system of claim 7, wherein records are added to the main flat table daily and the snapshot load framework is further configured, after a predefined time interval to:
   create a new history table; and
   archive a target subset of metadata included in the standard view table in the new history table, the target subset of metadata corresponding to records added to main table during the time interval.

12. The system of claim 11, wherein the snapshot load framework is configured to add a partition to the main flat table after creation of each new history table.

* * * * *